Feb. 1, 1944.  N. A. SARGENT  2,340,567

PREPARATION OF ALUMINUM SULPHATE

Filed Dec. 28, 1940

INVENTOR.
NEIL A. SARGENT
BY
ATTORNEY.

Patented Feb. 1, 1944

2,340,567

UNITED STATES PATENT OFFICE 2,340,567

PREPARATION OF ALUMINUM SULPHATE

Neil A. Sargent, Winchester, Mass., assignor to Monsanto Chemical Company, St. Louis, Mo., a corporation of Delaware Application December 28, 1940, Serial No. 372,035

13 Claims. (Cl. 23—123)

This invention relates to the preparation of sulphates of aluminum which have an unusually high content of alumina and at the same time are substantially completely water soluble. More specifically the invention relates to the preparation of water soluble high basic sulphates of aluminum of low water content, or of mixtures of such sulphates in any proportion with substantially anhydrous neutral sulphate of alumina.

Basic aluminum sulphate is aluminum sulphate which contains materially less sulphuric acid than that required by the formula $Al_2(SO_4)_3$, or which contains alumina in excess of that required by the formula $Al_2(SO_4)_3$, otherwise frequently written as $Al_2O_3.3SO_3$. It is convenient to refer to the alumina present as excess alumina in terms of basicity or percentage basicity. For example, a product having a total alumina content of 33 parts in the hundred, of which 22 parts are required by the formula $Al_2O_3.3SO_3$ and 11 parts are in excess, may be said to have 33% total alumina and a basicity, or percentage basicity, of $33\frac{1}{3}\%$ $\frac{(11 \times 100)}{33}$.

The present invention is in general primarily concerned with the preparation of basic sulphates of aluminum having an $Al_2O_3$ content of about 21 to 34% and a basicity of about 22 to 34%. More particularly the invention is concerned with the preparation of high basic sulphates having the general formula $Al_2O_3 \cdot 2SO_3$, otherwise known as disulphate of alumina. All of these products are readily soluble in water, and lend themselves to easy dehydration to a lower hydrated form. Thus, it is possible in accordance with the methods described herein to prepare disulphates of alumina containing $9H_2O$, $8H_2O$, $4H_2O$ and $2H_2O$ respectively. These products also have the advantage of having a lower sulphuric acid content and a higher content of $Al_2O_3$ available in soluble form than the trisulphate of alumina now being made commercially, and hence are definitely superior to previously prepared products for such purposes as water purification and paper manufacture.

In the past aluminum sulphate has been prepared commercially by reacting bauxite, commercial aluminum hydrate, or other acid soluble aluminous materials with sulphuric acid of 50 to 55° Bé. strength, with the addition of water or wash liquors, so that a neutral or slightly basic solution of aluminum sulfate results which is subsequently boiled down to a solid product. This commercial product contains from 16–18% alumina and from 40–45% water and is in the form of a glass-like solid solution. If one attempts to dehydrate commercial aluminum sulphate by heating however, it is found that the material softens up to a semi-fluid sticky mass. Moreover, further heating will cause fluidity throughout with the exception of the top surface which is cooled to a temperature below the solidification point by evaporation. This results in the formation of a crust or film over the surface which increases the difficulty both mechanically and thermally, of removing water vapor. This fluid sticky melt also tends to adhere strongly to any metallic surface, and in the course of continuous operation of the equipment will build up accretions of sulphate which require frequent removal, a factor of disadvantage in any commercial process, and especially so in this case where the deposited material is an extremely hard cement-like structure.

The commercial manufacture of aluminum sulphate as it is carried out at present results primarily in the formation of a neutral aluminum sulphate. However, when attempts are made to dehydrate, as by boiling down or any similar method, basic aluminum sulphate, the same conditions are encountered. Moreover, when boiling down basic sulphates insoluble sulphates are formed, which may render the final product unsuitable for commercial operations.

Numerous methods have been devised for overcoming the difficulties due to the physical characteristics of the solid solution of neutral sulphate referred to above, but none of them has been entirely satisfactory. One method of treatment involves spray drying, or almost instantaneous dehydration of extremely fine droplets of concentrated aluminum sulphate solution in a suitable apparatus. This type of process, however, results in a very bulky and voluminous product, so that an appreciable amount of the economic advantage gained by the dehydration is lost. Other methods which have been employed are concerned with mechanical means for handling the semi-fluid to fluid mass which is formed as a result of attempts to dry the commercial product by ordinary heating. That these methods possess certain inherent disadvantages is evidenced by the fact that anhydrous aluminum sulphates are not now produced commercially to any appreciable extent, if at all. Likewise, as far as is now known, no attempt has been made to prepare any commercial scale high basic sulphates of alumina of the unusually high $Al_2O_3$ content of the products described herein, nor have dehydrated products of this nature been prepared.

It is accordingly an important object of the present invention to provide a method of preparing commercially sulphates of alumina of the highest possible alumina content which are at the same time substantially completely soluble in water.

A further object of the invention is to provide a method of preparing substantially anhydrous or almost anhydrous basic sulphates of alumina which are substantially completely soluble in water.

A further object of the invention is to provide a method of dehydrating high basic sulphates of alumina without the formation of gummy substances and without the formation of insoluble basic sulphates of alumina.

A still further object of the invention is to provide a method of preparing high basic sulphates of alumina of low water content from relatively dilute solutions thereof.

A still further object of the invention is to provide a method of producing a sulphate of alumina of high basicity which is capable of the same commercial uses as the commonly known neutral sulphate of alumina and will be capable of dehydration to crystalline or anhydrous products containing more alumina than it is possible to obtain from the neutral product.

Still further objects and advantages of the invention will appear from the following description and appended claims when considered in connection with the accompanying drawing, in which:

Figure 1:
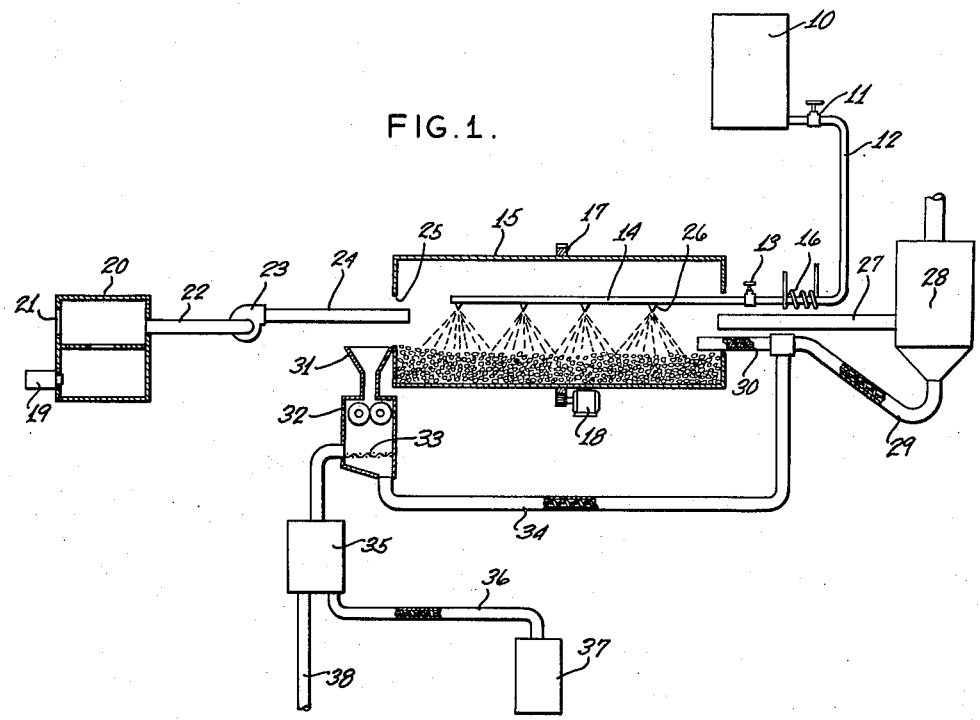
Fig. 1 represents a diagrammatic view of one of the preferred arrangements for carrying out the processes described herein.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is in general carried out by subjecting an aqueous solution of aluminum sulphate, consisting of either basic sulphate of aluminum or a mixture of neutral and basic sulphates of aluminum, to evaporation and crystallization which is sufficiently rapid to avoid the formation of water-insoluble forms of basic sulphate. This is preferably accomplished by subjecting the sulphate solution in the form of a thin film to suitable evaporating conditions, such as a controlled flow of hot air, combustion gases or the like, preferably in the presence of seed crystals and at temperatures which are substantially below the true boiling point of the solution. By proceeding in this manner, that is, by forming a film of the sulphate solution upon the surfaces of the preformed crystals, and simultaneously exposing the film coated crystals to hot gases of predetermined volume, temperature, humidity and speed of flow, it is possible to complete the evaporation and crystallization of the solution in from 10 to 90 seconds, even at temperatures below the boiling point, with a result that the formation of insoluble basic sulphates is substantially avoided and a product of high alumina content is obtained which lends itself readily to further dehydration.

It is possible to obtain such substantially insoluble free products from solutions of high basic aluminum sulphate solutions having a percentage basicity of 20% or higher on a small scale in the laboratory by restricting the boiling down period to not more than about twenty minutes, using temperatures at the boiling point of the solution, but it is practically impossible from a mechanical or thermal standpoint to do this on the large scale required in commercial operations. Thus, large scale batch evaporation, carried out at the boiling point, might under optimum conditions be completed in 1 or 2 hours, but in general require from 6 to 8 hours, or even longer, with a result that insoluble basic sulphates varying in amount from .2 to 1.25% by weight will be found in the final product. Even these small amounts of insoluble matter are detrimental, as they not only render unavailable a portion of the original $Al_2O_3$ content of the liquor being treated, but result in dirty solutions which require clarification prior to industrial use.

The preferred process of this invention may be carried out in a wide variety of apparatus, but is preferably carried out in a rotary cylindrical dryer of the type which rotates about a horizontal or substantially horizontal axis. Thus, the drying cylinder may be either slightly tilted or may be provided with inner walls which taper radially outward toward the discharge end of the apparatus. This permits a gradual flow of the crystals through the evaporation zone, which may be controlled by varying the speed of rotation. The sulphate liquor or solution may be supplied by any suitable means, and is preferably sprayed upon the crystals in predetermined amounts. The hot gases employed to effect dehydration may likewise be supplied in any suitable manner, and are preferably either blown endwise into the combustion chamber countercurrently to the movement of the crystals or introduced radially into the chamber in such a manner as to first pass through the moving bed of crystals in the lower portion thereof.

To successfully carry out the process of this invention a multiple control of material supply and temperatures is necessary. Thus, it is possible to vary the speed and thoroughness of the drying and crystallization by controlling (1) the rate of feed of the crystals upon which the film of sulphate liquor is formed, (2) the speed of rotation of the evaporation cylinder or vessel and its angle of inclination, both of which regulate the speed of flow of the crystals through the evaporation zone, (3) the rate of supply of the liquor sprayed upon the crystals, and (4) the volume of flow, humidity and temperature of the hot gases used to effect vaporization. By increasing the air or gas temperatures, gas volumes and the dryness of the gas, for example, the temperature of the crystal particles passing through the evaporating zone and the rate of evaporation and crystallization of the sulphate solution will be increased. To prevent too high a particle temperature and an excessively high rate of evaporation, i. e., sufficiently high to soften or melt the particles, the amount of solution sprayed upon the particles is increased. However, if too much solution is supplied, the film formed will be too thick with a result that the evaporation rate will be lowered, crystallization will be retarded, and exceedingly dense spherical particles will be formed, which are difficult to handle in subsequent processing and use.

It has been found that the most desirable conditions of evaporation and crystallization are those which permit the pellets or particles covered with a thin film of liquor to roll away from the zone of contact with the feed of solution or liquor, mix with the hot gases and become converted to crystal before the rotation of the cylinder or other evaporation vessel causes the particles to come in contact with fresh liquor. Preferably the rate of rotation, the depth of the bed of crystals, and the other variables hereinbefore referred to are adjusted to provide a conversion period of from 10 to 90 seconds, depending upon the thickness of the liquid film.

It has also been found that the most desirable rate of evaporation obtainable under the above control conditions is that which takes place at particle temperatures of between about 80° and 90° C. Thus, at these particle temperatures the evaporation rate is sufficiently rapid to produce a uniform and dense crystal growth over the surface of the preformed crystals without producing insoluble matter. Moreover, these temperatures are in any case less conducive to the formation of insoluble matter than higher evaporating temperatures, that is, even under relatively slow evaporating conditions, and they are well below the melting point of the crystal phase, so that there is no tendency toward stickiness or gum formation. If, however, the evaporating conditions are altered to yield particle temperatures between about 90° and 95° C., a certain amount of gummy materials and solid solutions are formed, while at particle temperatures above 95° C. the product becomes puffed and tends to melt and become sticky. If bed temperatures below 80° C. are produced, on the other hand, the crystal structure is less developed and the output of the apparatus is materially reduced, due largely to excessive wetness of the bed of crystals and the tendency of the material to cake or form rings.

A more complete understanding of the invention will be obtained from the following description of preferred forms of apparatus suitable for carrying out the process of this invention.

Referring to Fig. 1, the numeral 10 represents a storage tank for the solution of high basic aluminum sulphate to be evaporated and crystallized, which may contain from 2 to 14% of $Al_2O_3$. The solution is either pumped or permitted to flow by gravity from the tank 10 through valve 11, pipe 12 and valve 13 to the distributing pipe 14, which extends horizontally into the crystallizing evaporator 15. A preheater 16, which is of the usual steam heated type, surrounds the pipe 12 adjacent to valve 13, and serves to heat the liquid feed to a temperature equal to or less than that at which the evaporating crystallizer operates. The crystallizing evaporator 15 consists of a metal drum which is rotatable about a slightly inclined axis by means of any suitable driving mechanism, such as the ring gear 17 and motor 18, and is adapted to be rotated at from 8 to 20 revolutions per minute. It is supplied with heated air furnished by an oil or gas burner 19 situated in a suitable Dutch oven 20, which is provided with an air intake port 21 which is adapted to permit variation in the amount of air supplied to the crystallizer. The hot air is removed from the oven through pipe 22 by means of the blower 23, and is conveyed to the crystallizing evaporator 15 through pipe 24. Any suitable damper arrangement and variable speed drive for the blower 23 may be employed if desired, to obtain closer control. Furthermore, operation of the apparatus may be further facilitated by installing temperature controllers, humidity recorders, volume measuring devices, and any other similar equipment, where desired.

In operation, the crystallizing evaporator 15 is first filled with preformed crystals of aluminum sulphate having a total $Al_2O_3$ content of between 21 and 24% and a basicity between 30 and 33%, which may be produced on the small scale necessary for starting the process by boiling down high basic sulphate liquor to the form of a cake, which is then broken up and dried. The depth of this initial bed of crystals is determined by the size of the exit opening 25 at the discharge end of the crystallizer, i. e., by the radial distance of the edge of said opening from the inner periphery of the crystallizing drum or cylinder, which may be varied in any suitable manner. After filling the evaporator with crystals in the above manner hot gases from the oven 20 at temperatures between 205 and 325° C. are passed through the drum 15, while rotating it at from 8 to 20 revolutions per minute. The flow of sulphate liquor is then started, and is controlled by the valve 13, or by any suitable flow metering equipment adapted to maintain the liquid flow at a uniform rate. The liquor is then distributed over the surface of the rotating bed of crystals by means of the longitudinally spaced spray nozzles 26 located on the distributing pipe 14. If desired, the pipe 14 may be merely provided with orifices for this purpose, but the use of spray nozzles is preferred. The nozzles 26 should be spaced in such a manner as to avoid overlapping of the liquid distribution, which would produce an uneven wetting of the crystals and require a longer evaporating and crystallizing time. The pipe 14 may be made to reciprocate, if desired, as this insures the absence of sparsely wetted areas.

Contact with the solid particles heated to 80 to 90° C. and the hot gases causes rapid evaporation of the liquor, which is at substantially the same temperature as the particles, and the growth of a thin layer or cluster of crystals on the surfaces of the particles. The resulting crystals are of increased size and of high bulk density, and being essentially dry do not stick to the metal walls of the crystallizer. They are continually in motion, and tend to be broken up to some extent by the rolling action of the drum, which produces a natural classification and permits a discharge primarily of the larger pellets, usually ranging from 4 to 12 mesh in size. Smaller particles than this may be obtained, however, by adding steel balls to the mass of crystals in the drum 15.

A portion of the crystal bed in the drum 15 adjacent to its discharge end is not wet by the liquor coming from the distributing pipe 14. This permits the particle temperature of the bed at this point to rise from the preferred evaporating range of 80 to 90° C. to a range of temperatures in the neighborhood of 100 to 105° C. As a result, more water is removed and crystals are formed containing from 24 to 25% of soluble $Al_2O_3$ and having a basicity of from 30 to 33%.

The hot wet gases in the evaporating drum 15 pass out through the pipe 27 to a dust collector 28, and are then discharged into the atmosphere. The dust separated in the collector 28 is returned by means of the screw conveyor 29 and the crystal feed pipe 30 to the evaporator 15, where it is converted to pellet or crystal form by the previously described operation.

The solid crystals of high basic sulphate discharged from the evaporator through the opening 25 fall by gravity through the chute or hopper 31 into the roll crusher 32, which serves to break up the crystals of 4 to 12 mesh size to crystals of about 12 to 20 mesh size, which constitute a free flowing product of high bulk density. This grinding action also produces a certain amount of fines, which are separated by the screen 33. The fines are returned by the screw conveyor 34 to the feed pipe 30, and thus serve to maintain the bed of crystals in the evaporator 15, which would otherwise become empty as a result of its own rotation.

Crystals of any desired mesh size may be obtained by varying the position of the grinding rolls, and varying proportions of material may be returned to feed pipe 30 by varying the mesh size of screen 33. Also, if desired, any other suitable means may be used to divert and return a portion of the crystals to the evaporator, either in the form of fines or mixed fines and particles of larger mesh size.

The product separated from the fines and retained on the screen 33 may either be packed as such, in which case it has a basicity of 30 to 33% and an $Al_2O_3$ content of 24 to 25%, or it may be calcined to produce a product of higher $Al_2O_3$ content. Thus the oversize from screen 33 gradually falls by gravity to the bin 35, from which it is either conducted through the screw conveyor 36 to the packaging equipment 37 (bagging or barrel filling machinery), or it is conducted through the conveyor 38 to a calciner (not shown) of any suitable construction, after which it may be packaged.

It is important to avoid excessively high temperature conditions during the calcination, so that decomposition into insoluble basic sulphates will not occur. Preferably, the volume of drying gas and time of retention of the crystals in the calciner should be controlled in such a manner as to obtain a particle temperature in the range of 160 to 175° C. during at least 15 minutes of the drying and a temperature of not over 190° C. in the particles discharged from the calciner. This insures the preparation of a product of high basicity (30 to 33%) and high $Al_2O_3$ content (30 to 34%) which is at the same time substantially free of insoluble matter. Somewhat lower temperature condtiions may of course be utilized, if a product of less than 30% $Al_2O_3$ content is desired.

A further understanding of the invention will be obtained from the following example, in which an apparatus of the type described above is employed:

Two hundred twenty-five (225) pounds of preformed aluminum sulphate crystals of a basicity of 30 to 33% are placed in the bottom of a rotary evaporator, such as that shown in the drawing. The evaporator is rotated at about 8 revolutions per minute, thereby forming a rolling bed of crystals having a maximum thickness of from 1 to 1½ inches. Eight hundred eighty (880) to 1000 cubic feet of hot combustion gases per minute are passed into the evaporator with the gases at an entering temperature between 270 and 300° C., and at the same time a solution of aluminum sulphate of 30 to 33% basicity and about 9% alumina content is sprayed on the preformed crystals at the rate of 200 pounds per hour. During each hour 300 pounds of the crystals discharged from the evaporator are recirculated to maintain the bed of crystals therein and provide new surface for film evaporation, and 72 pounds of crystals are diverted to the storage bin. The temperature of the crystals in the evaporating zone during the above treatment is within the range of 85 to 87° C., while the wet gases leaving the evaporator are at a temperature of 90 to 95° C. In the drying zone at the discharge end of the evaporator, where the particles are not sprayed, their temperature rises to 95 to 100° C. with a result that the material leaving the evaporator has an $Al_2O_3$ content of 24 to 25%. This product may be readily calcined in the manner described above to a material of 30 to 34% $Al_2O_3$ which contains substantially no insoluble matter.

Figure 2:
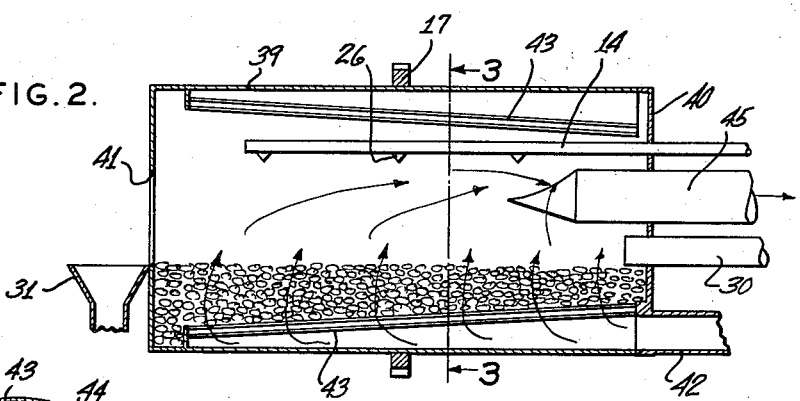
Fig. 2 is a longitudinal sectional view of a modified form of evaporating drum which is especially suitable for the purposes of this invention.
Figure 3:
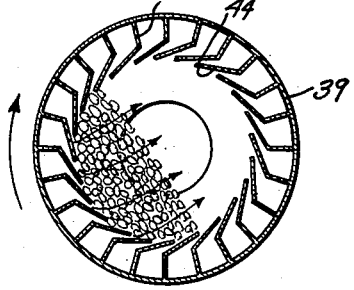
Fig. 3 is a transverse sectional view taken on the line 3—3 of Fig. 2.

A somewhat modified form of evaporating drum, which is unusually effective in accomplishing the purposes of this invention, is shown in Figs. 2 and 3. This evaporator, which is adapted to be employed in connection with the general arrangement shown in Fig. 1, is similar in many respects to the so-called Roto-Louvre dryer made by the Link-Belt Company. It consists of a horizontally extending drum 39, which is positioned to rotate about a substantially horizontal axis and is provided with a stationary head 40 at its feed end and a discharge opening 41 of variable diameter at the opposite end. As in the apparatus shown in Fig. 1, the solution of aluminum sulphate is supplied by means of pipe 14 and nozzles 26, and the preformed crystals are supplied by feed pipe 30. In this instance, however, the hot drying gases are also supplied at the feed end by means of the flanged opening or pipe connection 42.

The inner periphery of drum 39 is provided with a plurality of longitudinal members 43, which extend radially inward a short distance and are then bent reversely of the direction of rotation in such a manner as to tangentially overlap an adjacent member and form louvres. The members 43 thus provide a series of parallel longitudinally extending air or gas passages around the entire inner circumference of the drum with louvre openings 44 adapted to permit the flow of hot gas radially inward. As the pipe connection 42 registers only with those air passages which are directly beneath the bed of crystals, as the drum revolves, the members 43 are in contact with hot gases for only about one quarter of each revolution and are then exposed to the lower exhaust gas temperature. For this reason, they do not become very hot, and the heat is transmitted to the crystals primarily by convection rather than conduction or radiation.

To facilitate movement of the crystals toward the exit opening 41 of the drum, the radially extending portions of members 43 are made narrower and the tangentially extending overlapping portions wider in the direction of crystal flow. Thus, the inner wall of drum 39 formed by the tangential portions of members 43 assumes the shape of a truncated cone having its smallest diameter adjacent the feed end and its largest diameter adjacent the discharge end of the drum.

After the gases have passed through the bed of crystals, they are withdrawn through the exhaust tube 45, which preferably extends a considerable distance into the drum. This prevents the gradual accumulation of moisture vapor in the drum and consequent retarding of the drying process, which occurs when spent gases must travel the full length of the drum.

Although the two forms of evaporating crystallizers described above and shown in the drawing are preferred, a wide variety of evaporators may be used in their stead. Thus, rotary drums of the nature of cement mixers may be used, in which case the evaporating gases pass only over the surface of the bed; or devices, such as gas ducts or lifters may be employed to cause the gases to pass through the bed. Moreover, a single dryer may be used to accomplish both the evaporation and calcination and to obtain directly a product of 32 to 34% $Al_2O_3$ content. Film evaporators of the drum dryer type may also be employed, but in such instances the liquor solidifies in the form of a cake, which must subsequently be broken up and crushed.

Any suitable spraying or distributing means which is capable of forming a thin film can be used instead of the device described above, and it may extend over the entire length or only over a portion of the crystal bed. It is even possible to employ a spray tower, using hot gas volumes and temperatures productive of particle temperatures between 80 and 90° C. When spray drying, as compared with film drying, is employed, however, the final product is of considerably lower density than the products obtained in accordance with the preferred methods described herein.

The methods described herein are generally carried out at atmospheric pressures. Nevertheless, it is possible to employ conditions of partial or substantially complete vacuum to assist in the removal of water from the sulphate solutions.

By proceeding in accordance with the preferred process of this invention, i. e., by applying a film of liquor upon a rotating bed of crystals under controlled conditions of temperature and humidity, it is possible to obtain high basic sulphates of aluminum which are not only substantially free of insoluble material but of a high bulk density. Moreover, these products lend themselves to easy dehydration to sulphates of lower hydration without any swelling, separation of liquid phase, or formation of insoluble sulphates resulting from the presence of liquid phase.

The operations described herein may be carried out either batchwise or in a continuous manner. However, the output of the crystallizer is greatly increased by continuously feeding in partially dehydrated crystals, varying from the $6H_2O$ hydrate down to the $2H_2O$ hydrate, simultaneously with the liquor, for example in the manner hereinbefore described.

Although the methods described herein are primarily applicable to the preparation of basic, and particularly high basic sulphates of aluminum, they may also be used to advantage in the manufacture of neutral sulphates of aluminum. Thus, even though the formation of insoluble materials is not one of the problems encountered in the manufacture of neutral sulphates or sulphates having basicities below 28%, it will be found that the methods of this invention are nevertheless an improvement over present commercial methods of making these products, since they result in products which are free flowing, of high bulk density, and ready for immediate packaging upon being discharged from the crystallizer. Furthermore, they are more economical than the methods now commonly used, since they require less labor and may be carried out at a higher overall thermal efficiency.

What I claim is:

1. The method of preparing crystalline aluminum sulphate of high alumina content which comprises coating preformed crystal particles of aluminum sulphate maintained at a temperature of from 80 to 95° C. and having a basicity of from zero to 34% with a thin film of a solution of aluminum sulphate having a basicity of from zero to 34% and an $Al_2O_3$ content of from 2 to 14%, simultaneously evaporating said solution by passing hot gases through the film covered crystals, thereby forming additional crystals of aluminum sulphate around said preformed crystals, said solution and said gases being supplied at such rates as to maintain a particle temperature of from 80 to 95° C. during the evaporation and crystallization, removing the resulting mass of crystals from the zone of evaporation, and then calcining the mass.

2. The method of preparing crystalline aluminum sulphate of high alumina content which comprises passing a mass of preformed crystal particles of aluminum sulphate maintained at a temperature of from 80 to 95° C. and having a basicity of from zero to 34% through a zone of evaporation, coating said crystal particles as they pass through said zone with a thin film of a solution of aluminum sulphate having a basicity of from zero to 34% and an $Al_2O_3$ content of from 2 to 14%, simultaneously evaporating said solution by passing hot gases over the film covered crystals, thereby forming additional crystals of basic aluminum sulphate around said preformed crystals; said particles, said solution and said gases being supplied at such rates and said gases being at such temperatures as to maintain a particle temperature of from 80 to 95° C. during the evaporation and crystallization; removing the resulting mass of crystals from the zone of evaporation, and then calcining the mass.

3. The method of preparing crystalline aluminum sulphate of high alumina content which comprises passing a mass of preformed crystal particles of aluminum sulphate maintained at a temperature of from 80 to 95° C. and having a basicity of from zero to 34% through a zone of evaporation, coating said crystal particles as they pass through said zone with a thin film of a solution of aluminum sulphate having a basicity of from zero to 34% and an $Al_2O_3$ content of from 2 to 14%, simultaneously evaporating said solution by passing hot gases over the film covered crystals, thereby forming additional crystals of basic aluminum sulphate around said preformed crystals; said particles, said solution and said gases being supplied at such rates and said gases being at such temperatures as to maintain a particle temperature of from 85 to 87° C. during the evaporation and crystallization; removing the resulting mass of crystals from the zone of evaporation, and then calcining the mass.

4. The method of preparing crystalline aluminum sulphate of high alumina content which comprises continuously feeding a mass of preformed crystal particles of aluminum sulphate maintained at a temperature of from 80 to 95° C. and having a basicity of from zero to 34% into a continuously rotating chamber, continuously spraying said crystal particles as they pass through said chamber with a solution of aluminum sulphate having a basicity of from zero to 34% and an $Al_2O_3$ content of from 2 to 14%, simultaneously evaporating said solution by continuously passing hot gases over said crystal particles, thereby forming additional crystals of basic aluminum sulphate around said preformed crystals; said particles, said solution and said gases being supplied at such rates and said gases being at such temperatures as to maintain a particle temperature of from 80 to 95° C. as said particles pass through said chamber, removing the resulting mass of crystals from said chamber, and then calcining the mass.

5. The method of preparing crystalline aluminum sulphate of high alumina content which comprises continuously feeding a mass of preformed crystal particles of aluminum sulphate maintained at a temperature of from 80 to 95° C. and having a basicity of from zero to 34% into a continuously rotating chamber, continuously spraying said crystal particles as they pass through a portion of said chamber with a solution of aluminum sulphate having a basicity of from zero to 34% and an $Al_2O_3$ content of from 2 to 14%, simultaneously evaporating said solution by continuously passing hot gases over said crystal particles, thereby forming additional crystals of basic aluminum sulphate around said preformed crystals; said particles, said solution and said gases being supplied at such rates and said gases being at such temperatures as to maintain a particle temperature of from 80 to 95° C. as said particles pass through said portion of said chamber and a particle temperature of 90 to 105° C. as said particles pass through the remainder of said chamber, removing the resulting mass of crystals from said chamber, and then calcining the mass.

6. The method of preparing crystalline aluminum sulphate of high alumina content which comprises feeding a mass of preformed crystal particles of aluminum sulphate maintained at a temperature of from 80 to 95° C. and having a basicity of from zero to 34% into one end of a continuously rotating and slightly inclined horizontally extending cylinder, spraying said crystal particles with a solution of aluminum sulphate having a basicity of from zero to 34% and an $Al_2O_3$ content of 2 to 14%, simultaneously evaporating said solution by counter-currently passing hot gases over the sprayed particles, thereby forming additional crystals of basic aluminum sulphate around said preformed crystals; said solution and said gases being supplied at such rates and said gases being at such temperatures as to maintain a particle temperature of from 80 to 95° C. as said particles pass through said cylinder, removing the resulting mass of crystals from said cylinder, dividing the crystals into two portions, returning one portion to the feed end of said cylinder, and calcining the other portion, said method being carried out in a continuous and cyclic manner.

7. The method of preparing crystalline aluminum sulphate of high alumina content which comprises feeding a mass of preformed crystal particles of aluminum sulphate maintained at a temperature of from 80 to 95° C. and having a basicity of from zero to 34% into a continuously rotating evaporating cylinder, spraying said crystal particles with a solution of aluminum sulphate having a basicity of from zero to 34% and an $Al_2O_3$ content of from 2 to 14% to form a film on the surface thereof, simultaneously evaporating said film by passing hot gases over the sprayed particles, thereby forming additional crystals of basic aluminum sulphate around said preformed crystals, said evaporation taking place at such a rate that the film on said crystals is completely converted to crystal form before being exposed to further wetting as a result of the rotation of said cylinder; said solution and said gases being supplied at such rates and said gases being at such temperatures as to maintain a particle temperature of from 80 to 95° C. as said particles pass through said cylinder, removing the resulting mass of crystals from said cylinder and then calcining the mass.

8. The method of preparing crystalline aluminum sulphate of high alumina content which comprises feeding a mass of preformed crystal particles of aluminum sulphate maintained at a temperature of from 80 to 95° C. and having a basicity of from zero to 34% to a zone of evaporation, coating said crystal particles with a thin film of a solution of aluminum sulphate having a basicity of from zero to 34% and an $Al_2O_3$ content of from 2 to 14%, simultaneously evaporating said solution by passing hot gases over the film covered crystals, thereby forming additional crystals of basic aluminum sulphate around said preformed crystals, said solution and said gases being supplied at such rates and said gases being at such temperatures as to maintain a particle temperature of from 80 to 95° C. as the particles pass through the evaporation zone, removing the resulting mass of crystals from said zone, crushing said crystals to a predetermined size, dividing said crystals into two portions, returning one portion to the evaporation zone, and calcining and packaging the remaining portion.

9. The method of preparing crystalline aluminum sulphate of high alumina content which comprises feeding a mass of preformed crystal particles of aluminum sulphate maintained at a temperature of from 80 to 95° C. and having a basicity of from zero to 34% to a zone of evaporation, coating said crystal particles with a thin film of a solution of aluminum sulphate having a basicity of from zero to 34% and an $Al_2O_3$ content of from 2 to 14%, simultaneously evaporating said solution by passing hot gases over the film covered crystals, thereby forming additional crystals of basic aluminum sulphate around said preformed crystals, said solution and said gases being supplied at such rates and said gases being at such temperatures as to maintain a particle temperature of from 80 to 95° C. as the particles pass through the evaporation zone, removing the resulting mass of crystals from said zone, crushing said crystals to a predetermined size, dividing said crystals into two portions, returning one portion to the evaporation zone, and calcining the remaining portion, said calcination being carried out in such a manner as to maintain particle temperatures between 160 and 175° C. for at least 15 minutes and a particle temperature of not over 190° C. at the end of said calcination.

10. The method of preparing crystalline aluminum sulphate of high alumina content which comprises feeding a mass of preformed crystal particles of aluminum sulphate maintained at a temperature from from 80 to 95° C. and having a basicity of from 22 to 34% into a continuously rotating evaporating cylinder, spraying said crystal particles with a solution of aluminum sulphate having a basicity of from 22 to 34% and an $Al_2O_3$ content of from 2 to 14% to form a film on the surface thereof, simultaneously evaporating said film by passing hot gases over the sprayed particles, thereby forming additional crystals of basic aluminum sulfate around said preformed crystals, said evaporation taking place at such a rate that the film on said crystals is completely converted to crystal form before being exposed to further wetting as a result of the rotation of said cylinder; said solution and said gases being supplied at such rates and said gases being at such temperatures as to maintain a particle temperature of from 80 to 95° C. as said particles pass through said cylinder, removing the resulting mass of crystals from said cylinder, dividing the crystals into separate portions, returning one portion to the feed end of said cylinder, and then calcining the other portion, said method being carried out in a continuous and cyclic manner.

11. The method of preparing crystalline aluminum sulphate of high alumina content which comprises covering preformed crystal particles of aluminum sulphate maintained at a temperature of from 80 to 95° C. and having a basicity of from zero to 34% with a thin film of a solution of aluminum sulphate having a basicity of from zero to 34% and an $Al_2O_3$ content of from 2 to 14%, evaporating said solution by passing hot gases in contact with the film covered crystals, thereby forming additional crystals of aluminum sulphate around said preformed crystals, said gases being supplied at such a rate as to maintain a particle temperature of from 80 to 95° C. during the evaporation and crystallization, removing the resulting mass of crystals from the zone of evaporation in the form of non-adhering particles.

12. The method as defined in claim 11, and further characterized in that the evaporation of any particular particle is substantially completed in from 10 to 90 seconds.

13. The method as defined in claim 11, and further characterized in that the evaporation is carried out at a temperature below the boiling point of the aluminum sulphate solution.

NEIL A. SARGENT.

CERTIFICATE OF CORRECTION.

Patent No. 2,340,567. February 1, 1944.

NEIL A. SARGENT.

It is hereby certified that error appears in the printed specification of the above numbered patent requiring correction as follows: Page 5, first column, line 68, for "below 28%" read --below 22%--; page 6, second column, line 66, claim 10, for "from" first occurrence, read --of--; and that the said Letters Patent should be read with this correction therein that the same may conform to the record of the case in the Patent Office.

Signed and sealed this 11th day of April, A. D. 1944.

Leslie Frazer

(Seal) Acting Commissioner of Patents.